(12) United States Patent
Fink et al.

(10) Patent No.: US 12,231,291 B2
(45) Date of Patent: *Feb. 18, 2025

(54) TRANSACTIONAL DISTRIBUTION OF MODELLED CONFIGURATION FROM A CENTRALIZED SERVER TO A PLURALITY OF SUBSIDIARY DEVICES

(71) Applicant: Arista Networks, Inc., Santa Clara, CA (US)

(72) Inventors: Michael Gibbings Fink, San Francisco, CA (US); Justin Costa-Roberts, San Francisco, CA (US); Avinash Siva Kumar, San Francisco, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,077

(22) Filed: May 25, 2023

(65) Prior Publication Data

US 2023/0300025 A1    Sep. 21, 2023

Related U.S. Application Data

(63) Continuation of application No. 17/569,406, filed on Jan. 5, 2022, now Pat. No. 11,695,627.

(51) Int. Cl.
*H04L 41/08* (2022.01)
*H04L 41/0813* (2022.01)
*H04L 41/0853* (2022.01)

(52) U.S. Cl.
CPC ...... *H04L 41/0813* (2013.01); *H04L 41/0856* (2013.01)

(58) Field of Classification Search
CPC ................ H04L 41/0813; H04L 41/0856

USPC ......................................................... 709/221
See application file for complete search history.

(56) References Cited

U.S. PATENT DOCUMENTS

| | | | |
|---|---|---|---|
| 6,038,586 A | 3/2000 | Frye | |
| 10,212,031 B2 | 2/2019 | Subramanian et al. | |
| 2012/0109913 A1* | 5/2012 | Rajure | H04L 45/54 707/694 |
| 2017/0034023 A1* | 2/2017 | Nickolov | H04L 43/0817 |
| 2018/0084306 A1 | 3/2018 | Hunter | |

(Continued)

FOREIGN PATENT DOCUMENTS

WO   20150179915 A1   12/2015

OTHER PUBLICATIONS

International Search Report and Written Opinion, PCT application No. PCT/US2022/082354, mailed May 4, 2023, 14 pages.

*Primary Examiner* — Sibte H Bukhari
(74) *Attorney, Agent, or Firm* — Fountainhead Law Group, PC

(57) ABSTRACT

Techniques are provided for facilitating network devices to obtain configuration updates from a central configuration repository. Configuration update information is received regarding a configuration update in a configuration repository. A data tree is updated based on the configuration update information. An identifier unique to the update is generated. A determination is performed that network device properties of a network device correspond to a set of network device properties indicated for the configuration update information. A notification indicating the availability of the configuration update is sent over one or more networks to the network device.

17 Claims, 9 Drawing Sheets

(56) References Cited

U.S. PATENT DOCUMENTS

2018/0329829 A1\* 11/2018 Zmudzinski ........ G06F 12/1027
2020/0004742 A1 1/2020 Nagarajan et al.
2021/0319015 A1\* 10/2021 Duda .................... G06F 16/244

\* cited by examiner

TRANSACTIONAL DISTRIBUTION OF MODELLED CONFIGURATION FROM A CENTRALIZED SERVER TO A PLURALITY OF SUBSIDIARY DEVICES

CROSS-REFERENCE TO RELATED APPLICATION

This application is a continuation application and, pursuant to 35 U.S.C. § 120, is entitled to and claims the benefit of earlier filed application U.S. application Ser. No. 17/569,406 filed Jan. 5, 2022, the content of which is incorporated herein by reference in its entirety for all purposes.

BACKGROUND

A multitude of network devices, such as routers and network switches, can be deployed to implement large or complex networks. Companies or universities, for example, may host hundreds of network devices to provide a network of sufficient bandwidth and speed to support the needs of users (e.g., students, employees). An issue with networks of such size is monitoring, tracking, and updating configurations for the network devices. More particularly, tracking which network devices should receive a configuration update, which network devices have implemented a configuration update, and how to distribute configuration updates so that the target network devices are appropriately updated is a time-intensive and meticulous endeavor for a team of network administrators. Moreover, monitoring historical configuration data across network devices in a large network is a painstaking task involving tracking specific details for each of the network devices.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

The present disclosure is directed to a service that enables a plurality of network devices to obtain configuration updates from a central configuration repository. The configuration repository includes a persistent storage layer for storing network device configurations. A configuration management system generates, for each configuration update, an epoch that includes an update identifier and a reference to a location in a predefined data tree. Epoch information includes an identifier associated with a data object of the data tree and may include path information regarding one or more associations between data objects of the data tree.

Network devices may send a subscription request to the configuration management service to receive notifications regarding configuration updates that apply to the network device. The configuration management service receives configuration update information indicating that a configuration update has been stored in a configuration repository. The configuration management service updates the data tree based on the configuration update information and generates epoch information corresponding to the update to the data tree. The configuration management service sends a notification to a network device regarding the availability of the configuration update. The network device sends a request for a configuration update identifier to the configuration management service. The request may include one or more configuration identifiers identifying a previous configuration update implemented in the network device. The configuration management service provides the requested configuration update information based on the request.

As a result of the foregoing features, a large number of network devices may implement configuration updates without a central entity monitoring and tracking the configuration status of every network device. Moreover, a system for updating network device configurations is not burdened with monitoring historical modeled data of the network devices and configuration updates thereof.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1:
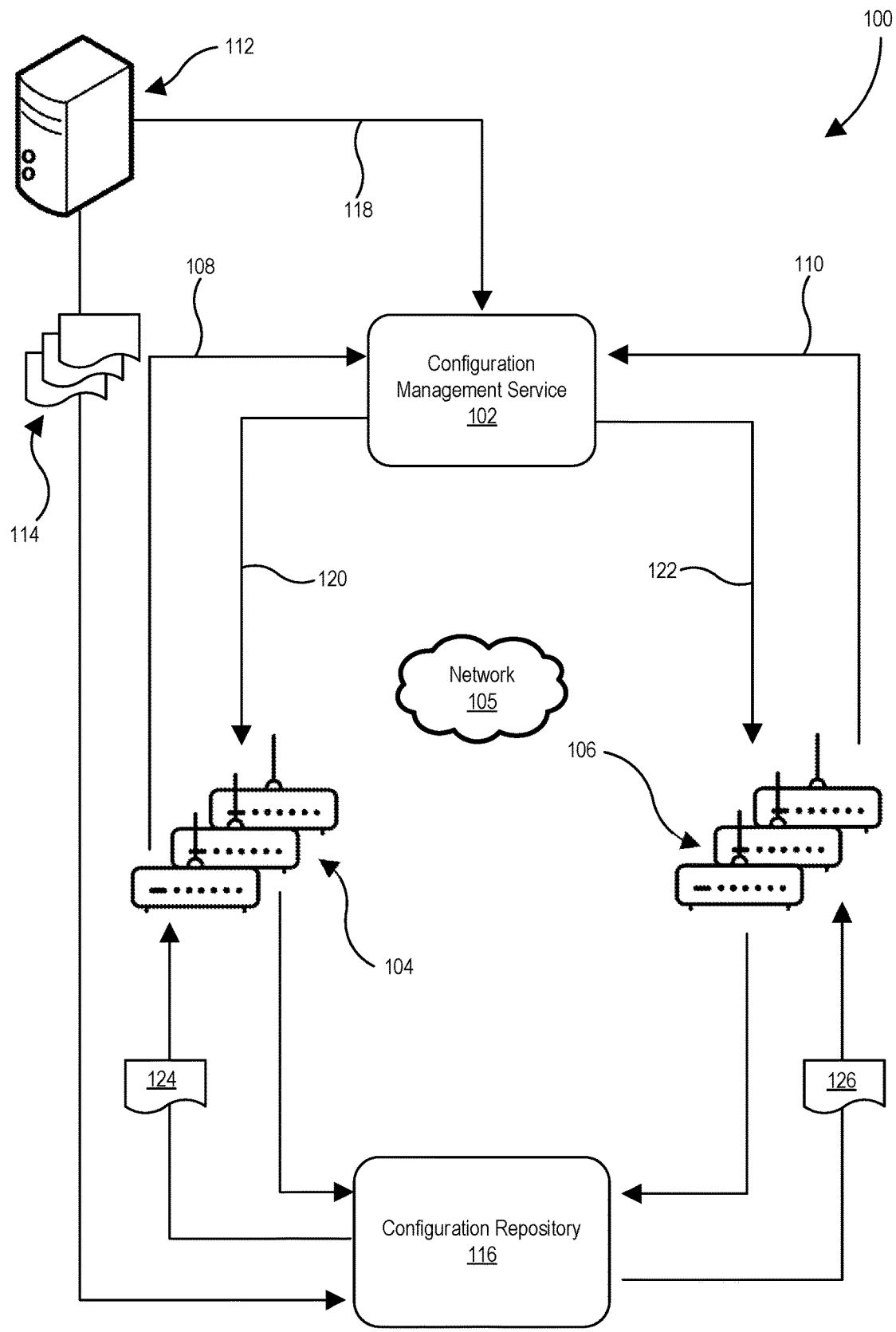
FIG. 1 illustrates an environment in which a configuration management service operates according to one or more embodiments.

FIG. 1 illustrates an exemplary environment 100 in which a configuration management service 102 operates according to one or more embodiments. The configuration management service 102 is configured to provide notifications to a set of network devices regarding the availability of a configuration update to be implemented on the set of network devices. The configuration management service 102 provides the notifications regarding the configuration update based on a set of properties that commonly characterize the set of network devices.

The environment 100 includes a plurality of network devices comprising a first set of network devices 104 and a second set of network devices 106. The first set of network devices 104 have a first set of properties in common and the second set of network devices 106 have a second set of properties in common, the first set of properties being different from the second set of properties. The first set of network devices 104 send, over one or more networks 105, subscription requests 108 to the configuration management service 102 to be notified regarding the availability of configuration updates to be applied to the first set of network devices 104. The second set of network devices 106 send, over the one or more networks 105, subscription requests 110 to the configuration management service 102 to be notified regarding the availability of configuration updates to be applied to the second set of network devices 106. The subscription requests 108 may include or reference the first set of properties shared by the first set of network devices 104 and the subscription requests 110 may include or reference the second set of properties shared by the second set of network devices 106.

A configuration update provider 112 provides, over the one or more networks 105, a set of configuration updates 114 to a configuration repository 116 that stores a plurality of configuration updates to be implemented in network devices. The configuration update provider 112 also sends, over the one or more networks 105 to the configuration management service 102, update information 118 regarding the set of configuration updates 114. The update information 118 may indicate a set of properties of network devices to which a configuration update of the set of configuration updates 114 is to be applied. The update information 118 may also include information identifying the set of configuration updates 114. For instance, the information identifying the set of configuration updates 114 may include an identifier or a location in memory for each of the set of configuration updates 114 in the configuration repository 116.

The configuration management service 102 processes the update information 118 and determines whether any of the set of configuration updates 114 should be implemented in the first set of network devices 104 and/or the properties of the second set of network devices 106. More particularly, the configuration management service 102 compares the set(s) of properties identified in the update information 118 with the properties of the first set of network devices 104 and the properties of the second set of network devices 106 to determine whether there is a match.

As a result of determining that a set of properties in the update information 118 correspond with the properties of a set of network devices, the configuration management service 102 sends a notification to the set of network devices regarding the availability of an applicable configuration update in the configuration repository 116. For instance, as a result of determining that the first set of properties of the first set of network devices 104 corresponds with properties identified in the update information 118, the configuration management service 102 sends a notification 120 to the first set of network devices 104 over the one or more networks 105. As a result of determining that the second set of properties of the second set of network devices 106 corresponds with properties identified in the update information 118, the configuration management service 102 sends a notification 122 to the second set of network devices 106 over the one or more networks 105.

The notification 120 indicates the availability of a first configuration update 124 in the configuration repository 116 and the notification 122 indicates the availability of a second configuration update 126 in the configuration repository 116. The notifications 120 and 122 include, respectively, information identifying the first configuration update 124 and the second configuration update 126. In response to the notification 120, the first set of network devices 104 obtain the first configuration update 124 from the configuration repository 116. In response to the notification 122, the second set of network devices 106 obtain the second configuration update 126 from the configuration repository 116. In some implementations, the first set of network devices 104 and/or the second set of network devices 106 may obtain additional configuration updates that are appropriate for respectively implementing the first configuration update 124 and/or the second configuration update 126.

The configuration management service 102 may be a service of a computing resource service provider that provides one or more services (e.g., network services) to customers, and whose services are configured to communicate with other services (e.g., of the service provider, third-party services) to fulfill requests, either directly or indirectly. For example, the configuration management service 102 may be a service provided by a computer network entity that provides hardware (e.g., servers, network devices), software, and/or cloud-based services for facilitating communications between computing devices. The configuration management service 102 comprises one or more processor-based devices that include one or more processors and computer-readable media storing instructions that, as a result of executing the instructions, cause the one or more processor-based devices to perform the operations described herein. In some embodiments, the configuration management service 102 is a cloud-based service that is part of a distributed computing services provider providing services to one or more entities. In some embodiments, the configuration management service 102 operates within a private network, such as an enterprise private network or a virtual private network, to provide configuration updates to a collection of network devices operating on behalf of a single entity.

The configuration update provider 112 is a processor-based entity that provides or otherwise makes available configuration updates for network devices. The configuration updates may be updates to software or firmware operating on the network devices. In some instances, the configuration updates may modify the operation of hardware of the network devices. The term "network devices," as used herein, refers to electronic hardware that facilitate communications between computing devices. Non-limiting examples of network devices include switches, routers, gateways, bridges, repeaters, modems, line drivers, and network interfaces.

The configuration repository 116 is a collection of one or more data stores that store configuration updates for network devices. In some embodiments, the configuration repository 116 may be a repository that stores and makes software for network devices and network management available to the public. In some embodiments, the configuration repository 116 may be a private repository in which software for network devices and network management is made available only to authorized entities, such as network devices owned and/or operated by a company.

The one or more networks 105 may include the Internet, an intranet, a cellular network, a local area network, a wide area network, a private network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof.

Figure 2:
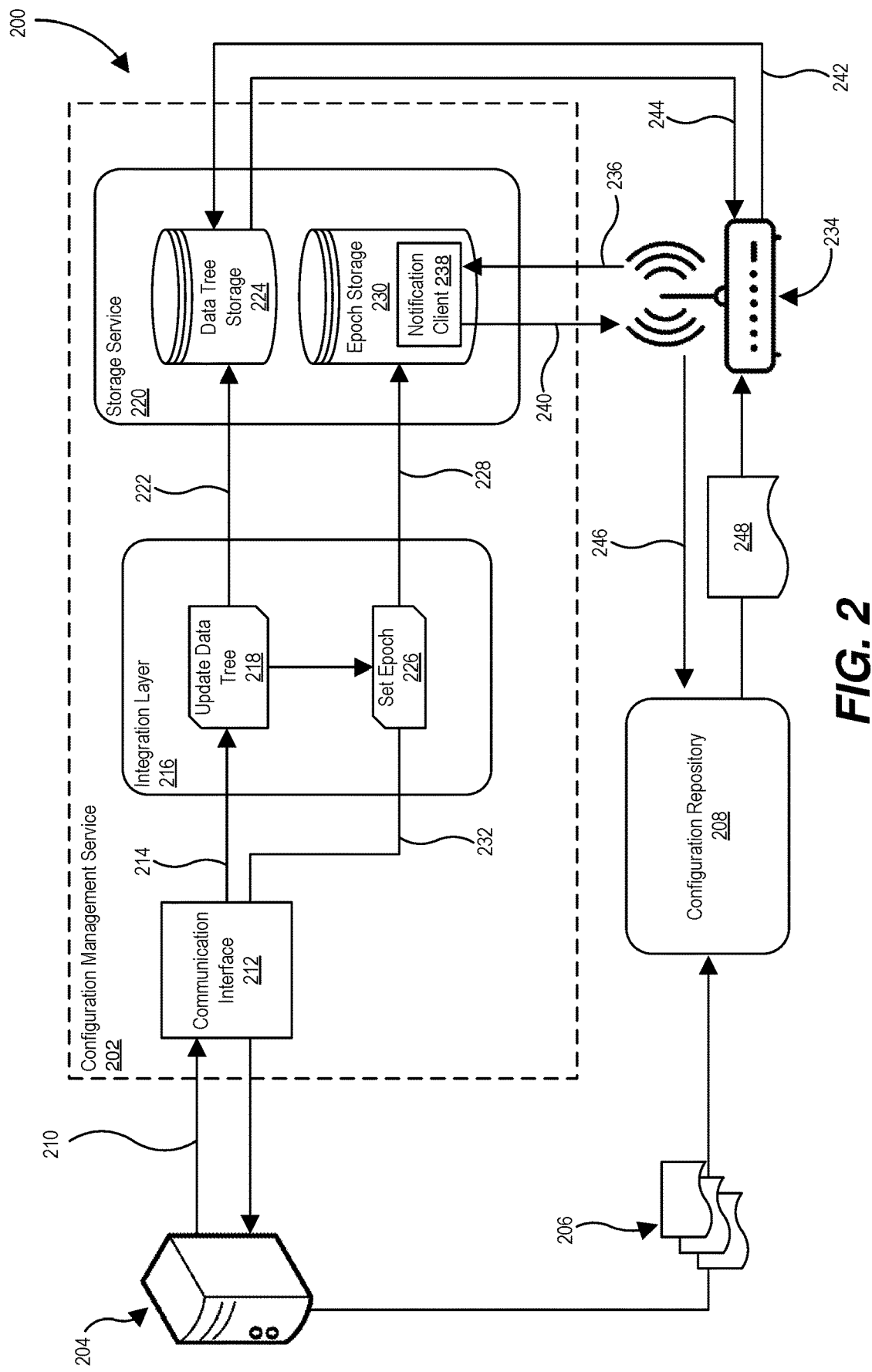
FIG. 2 illustrates an environment in which a configuration management service operates according to one or more embodiments.

FIG. 2 illustrates an exemplary environment 200 in which a configuration management service 202 operates according to one or more embodiments. Various features of FIG. 2 are described in greater detail with respect to FIG. 1, so further description thereof is omitted for brevity. A configuration update provider 204 provides a set of configuration updates 206 to a configuration repository 208, which stores the set of configuration updates 206 in data storage.

The configuration update provider 204 also sends update information 210 regarding the set of configuration updates 206 to the configuration management service 202. The update information 210 may indicate a set of data trees to which the set of configuration updates 206 respectively are to be applied. Updates are applied to the set of data trees stored in the configuration repository 208 based on a set of models—for example, using a schema specified by a model of the set of models. The update information 210 may include information identifying a set of target network devices to which the set of configuration updates 206 are to be respectively applied.

In some embodiments, the update information 210 may include a set of network device properties associated with individual configuration updates. For example, the set of network device properties may specify a make, model, build, range of serial numbers, etc., of a set of network devices; an operating system version running on network devices to which a configuration update applies; a firmware or BIOS version running on network devices to which a configuration update applies; a listing of software, services, or applications running on network devices to which a configuration update applies, including the currently installed versions thereof; and/or any other relevant information regarding the capabilities or current configuration of the network device to which a particular configuration update is to be applied.

The update information 210 may be received via a communication interface 212 of the configuration management service 202, the communication interface 212 being configured to transmit, receive, and manage communications to and from the configuration management service 202. The communication interface 212 may include hardware for sending and receiving communications over one or more networks. The communication interface 212 may include instructions stored in memory and executing on one or more processors that causes the communication interface 212 to perform as described herein. In some embodiments, the communication interface 212 may include an application programming interface (API) through which the configuration update provider 204 may communicate with the configuration management service 202.

The communication interface 212 is configured to process the update information 210 and send, to an integration layer 216 of the configuration management service 202, a request 214 to update a data tree 218. The request 214 may include at least some of the update information 210 and/or information derived therefrom regarding the configuration update 206 provided to the configuration repository 208. As a particular non-limiting example, the request 214 may include information identifying properties of a set of network devices to which the configuration update is to be applied. The integration layer 216 is configured to facilitate interaction between the configuration update provider 204 and a storage service 220 of the configuration management service 202. The integration layer 216 may be implemented via one or more processors executing instructions stored on one or more storage media, execution of the instructions causing the one or more processors to perform operations described herein. The integration layer 216, for example, may be embodied on one or more servers operating as at least part of the configuration management service 202.

In response to receiving the request 214, the integration layer 216 obtains a data tree associated with the configuration update and updates the data tree based on the configuration update. In some embodiments, the integration layer 216 may determine a data tree with which the configuration update is associated based on the network device properties indicated in the update information 210. A data tree is a representation of a network device data tree and comprises data representing configuration states of network devices and data representing changes between configuration states. The integration layer 216 updates the data tree by, for example, updating data in the data tree to represent configuration updates and relationships of configuration updates to other configuration updates of the data tree. The data tree(s) stored may include information associated with each node, such as a node identifier, and information identifying other nodes with which an individual node is associated.

The term "data model," as used herein, refers to an architecture for representing configuration and state data of network devices. A non-limiting example of a data model is a model created using the Yet Another Next Generation (YANG) modeling language. A data model is different from a collection of command line instructions for input to a command line interface.

In some embodiments, the data tree(s) stored in the data tree storage 224 may be data model trees having nodes representing configuration changes and segments representing relationships of the configuration updates to other configuration updates. The data model trees may be updated by adding a new node and a new segment connecting a previously defined node to the new node. The integration layer 216 may further modify the data tree to include information identifying the new node and/or information characterizing the configuration update implemented.

As a result of successfully updating the data tree in 218, the integration layer 216 provides an updated data tree 222 to be stored in data tree storage 224 of the storage service 220. The storage service 220 is a component of the configuration management service 202 that is a persistent storage for data models, epochs, and other relevant data. In some embodiments, the storage service 220 is configured to store path-based untyped streaming data.

As a result of storing the updated data tree 222 in data tree storage 224, the integration layer 216 initiates a routine 226 for generating an epoch 228, which includes identification information associated with the updated data tree 222. In some embodiments, the identification information of the epoch 228 may include information indicating a time and/or date associated with the updated data tree 222, such as a timestamp for a date/time at which the updated data tree 222 was generated. In some embodiments, the identification information may include a random number or a hash generated based on information associated with the updated data tree 222. The identification information may be any information that is unique to and suitable for identifying the updated data tree 222. The epoch 228 may also include location information referencing a location in the updated data tree 222. The integration layer 216 stores the epoch 228 generated in epoch storage 230 of the storage service 220.

The integration layer 216 may send a notification 232 to the communication interface 212 indicating whether the data tree update and the epoch generation were successful. The communication interface 212 may send the notification 232 to the configuration update provider 204 over one or more networks.

A network device 234 sends, over one or more networks, a subscription request 236 to the configuration management service 202 that is received by the storage service 220. The subscription request 236 is a request to receive notifications regarding changes in epoch data that are applicable to the network device 234. The subscription request 236 may include information regarding properties of the network device 234. Non-limiting examples of such properties include information regarding the make, model, build of the network device 234; an operating system version running on the network device 234; a firmware or BIOS version running on the network device 234; a listing of software, services, or applications running on the network device 234, including the currently installed versions thereof; and/or any other relevant information regarding the capabilities or current configuration of the network device 234.

The storage service 220 includes a notification client 238 that stores and classifies network devices based on the properties indicated in the subscription requests 236. The notification client 238 may be associated with the epoch storage 230 in some embodiments. The notification client 238 monitors the epochs 228 received from the integration layer 216 and compares the network device properties indicated for each of the epochs 228 received with the network device properties in the subscription requests 236. As a result of identifying a match between the network device properties, the notification client 238 sends a notification 240 to the network device 234 indicating the availability of a configuration update to be applied to the network device 234. The notification 240 may include at least some of the information in the epoch 228 for which the notification 240 was provided. The notification 240 may include an identifier regarding one or more aspects of the network device 234 to be updated. As an example, the identifier may indicate that the configuration update specified in the request 214 is applicable to an operating system of the network device 234, firmware of the network device 234, or one or more applications operating on the network device 234.

In response to receiving the notification 240, the network device 234 sends a tree path request 242 to the storage service 220 for information regarding a path in the updated data tree 222. More particularly, the tree path request 242 is a request for paths between two nodes (nodes inclusive) in the updated data tree 222. The tree path request 242 may include an identifier for a last configuration update of the network device 234 and an identifier provided in the notification 240, such as an identifier in the epoch 228. As a specific non-limiting example, the tree path request 242 may include a timestamp of an epoch associated with the last configuration update implemented in the network device 234 and a timestamp of the epoch 228 included in the notification 240.

The storage service 220 obtains, from the data tree storage 224, a set of paths between a first node and a second node in the updated data tree 222, the first node corresponding to the last configuration update implemented in the network device 234 and the second node corresponding to the configuration update of the epoch 228. The set of paths includes all nodes along the path between the first and second nodes, the nodes representing configuration updates between the last configuration update implemented in the network device 234 and the configuration update of the epoch 228. The storage service 220 sends data tree path information 244 to the network device 234 in response to the request 242, the data tree path information 244 including the set of paths between the first and second nodes in the updated data tree 222.

As a result of receiving the notification 240 and obtaining the data tree path information 244, the network device 234 sends a request 246, over one or more networks, to the configuration repository 208 for the configuration update corresponding to the epoch 228 and the configuration updates identified in the data tree path information 244. In response, the configuration repository 208 obtains a set of configuration updates 248 specified in the request 246 and sends the set of configuration updates 248 to the network device 234 over the one or more networks. The network device 234 then performs a set of operations to install the set of configuration updates 248. The network device 234 may send a notification (not shown) to the configuration management service 202 indicating whether installation of the set of configuration updates 248 was successful. The configuration management service 202 may notify the configuration update provider 204 regarding the success or failure of the network device 234 to implement the set of configuration updates 248.

Those skilled in the art will appreciate that the environment 200 may include a first plurality of network devices to which the configuration update indicated in the request 214 are to be applied. The environment 200 may include a second plurality of network devices to which the configuration update indicated in the request 214 do not apply. As a result, the first plurality of network devices, which include the network device 234, can autonomously obtain and implement configuration updates at an appropriate time without interrupting or otherwise adversely affecting network traffic.

Figure 3:
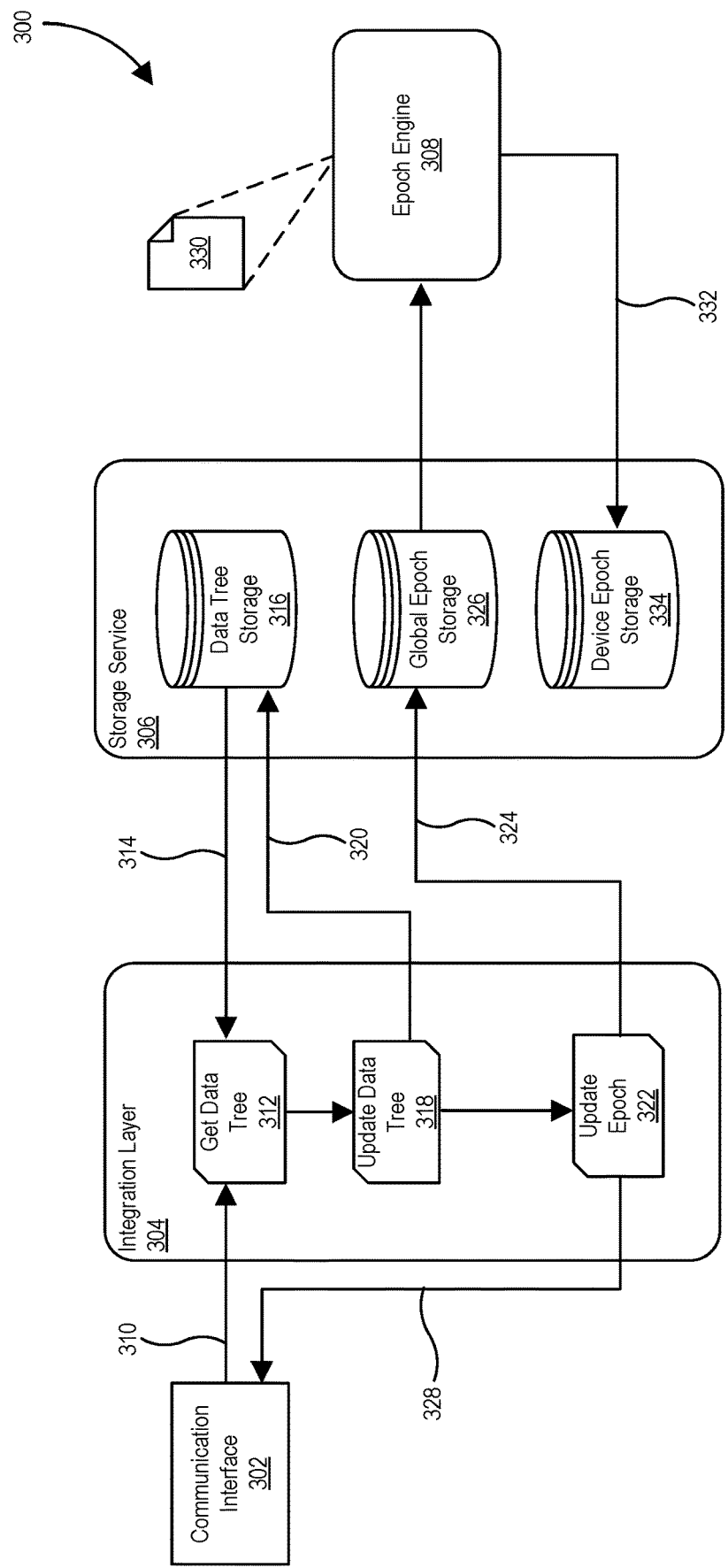
FIG. 3 illustrates an example configuration management service according to one or more embodiments.

FIG. 3 shows an example of a configuration management service 300 according to one or more embodiments. Various features in FIG. 3 are substantially similar to features described with respect to FIGS. 1, 2, and elsewhere herein, so further discussion thereof is omitted for brevity. The configuration management service 300 includes a communication interface 302, and integration layer 304, and a storage service 306, as described with respect to FIG. 2. The configuration management service 300 also includes an epoch engine 308 that is configured to copy epoch information to a device-specific path in a devices-model subtree described herein.

The communication interface 302 receives update information from a configuration update provider and sends a request 310 to the integration layer 304 to update a data tree, as described with respect to FIG. 2. The integration layer 304 obtains, at 312, a data tree 314 from a data tree store 316 of the storage service 306. In connection with obtaining the data tree at 312, the integration layer 304 may instruct the storage service 306 to lock a state of the data tree 314 so that the data tree 314 cannot be accessed until the data tree 314 is unlocked. The integration layer 304 generates, at 318, an updated data tree 320 based on the update information received from the configuration update provider. The integration layer 304 unlocks the data tree 314 and stores the updated data tree 320 in the data tree store 316 in place of the data tree 314.

The integration layer 304 performs an epoch update 322 to an epoch record stored in global epoch storage 326 of the storage service 306. More specifically, an epoch record corresponding to the data tree 314 is updated to an updated epoch record 324 in the global epoch storage 326. An identifier associated with the tree update 318 (e.g., a timestamp) and a path in the updated data tree 320 that corresponds to the tree update 318 may be updated to generate the updated epoch record 324. The updated epoch record 324 may indicate a set of network device properties to which the corresponding configuration update is to be applied. Examples of such network device properties are discussed with respect to the update information 210 in FIG. 2 and elsewhere herein. The integration layer 304 may send a status 328 to the communication interface 302 indicating whether the data tree update was successful. In some embodiments, the status 328 may include information included in the updated epoch record 324.

The epoch engine 308 determines a set of network devices to which a configuration update applies based on updated epoch record 324. The epoch engine 308 obtains, from the global epoch storage 326, the set of network device properties with which the updated epoch record 324 is associated. The epoch engine 308 maintains a subscriber record 330 that includes network device properties of the network devices that are subscribed to receive notifications regarding configuration updates.

The epoch engine 308 compares the network device properties for the updated epoch record 324 with the network device properties in the subscriber record 330. The epoch engine 308 determines a network devices list 332 indicating network devices to which the configuration update applies based on matches between the network device properties in the updated epoch record 324 and the subscriber record 330. The network device list 332 may indicate a set of paths or nodes in the updated data tree 320 associated with the updated epoch record 324.

The epoch engine 308 provides the network devices list 332 to device epochs data store 334, which stores information regarding associations between network devices and paths and/or nodes in data trees. In some embodiments, the device epochs data store 334 may store device-specific information regarding paths/nodes of data trees that are applicable to individual network devices. For instance, for a particular network device, the device epochs data store 334 may store a record of associated data trees in the data tree storage 316 that apply to the network device and may store a record of individual paths/nodes within an associated data tree that apply to the network device. The storage service 306 may send notifications to some or all of the set of devices indicated in the network devices list 332 indicating the availability of a configuration update to be applied.

Figure 4:
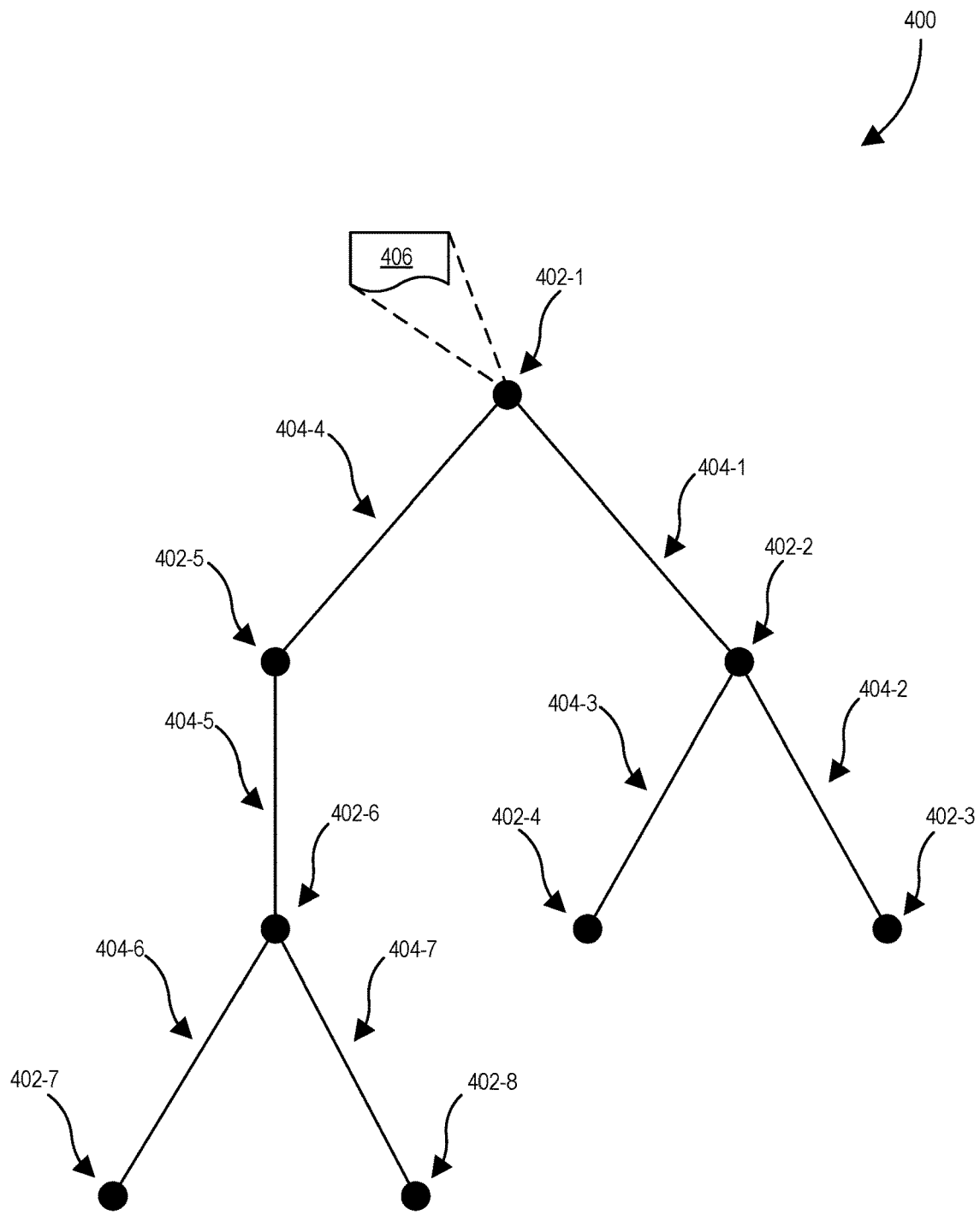
FIG. 4 illustrates a data tree maintained in data tree storage of a configuration management service according to one or more embodiments.

FIG. 4 shows a data tree 400 maintained in data tree storage of a configuration management service according to one or more embodiments. The data tree 400 is a particular representation of a data tree(s) 222 updated and stored in the data tree storage 224. The data tree 400 includes a plurality of nodes 402 and a plurality of segments 404 connecting pairs of nodes. Each of the nodes 402 has node data 406 associated therewith. The node data 406 includes an identifier of the node, such as a timestamp or a hash value, or a randomly generated number. In some embodiments, the data tree 400 is a data tree.

The node data 406 may include a reference to a node that was previously established and that is connected by a segment 404. For example, the node data 406 for a node 402-2 may include a reference to the node 402-1 via a segment 404-1. As a result, a current configuration of a network device can be traced backward to revert the network device to a previous configuration. The node data 406 may include a reference to or an identifier of a configuration update stored in the configuration repository that corresponds to the node.

The data tree storage may store a plurality of data trees 400, and each data tree may be specific to, e.g., a model or type of network device, an operating system running on a network device, a local or private network in which a set of network devices are located, and so on. The plurality of data trees 400 may therefore be used to synchronize configuration updates for a network or a plurality of network devices comprising a network by enabling the network devices to obtain appropriate configuration updates from a central repository that are specific to the network device.

A more particular, yet non-limiting, example will now be described with respect to the data tree 400 relative to a plurality of configuration updates. In the data tree 400, a node 402-1 corresponds to an initial configuration of a set of network devices. The node 402-1 has an identifier, which may correspond to a timestamp at a first time. A node 402-2 may be established at a second time and a node 402-3 may be established at a third time, the nodes 402-2 and 402-3 being connected by a segment 404-2. As discussed, the identifier for the node 402-2 is different from the identifier for the node 402-3. At a fourth time, a node 402-4 may be established and connected to the node 402-2 via a segment 404-3. As a result, network devices having a configuration corresponding to the node 402-3 may be converted to a configuration corresponding to the node 402-4 by identifying the node 402-2 as a previous node of the node 402-3, reverting the configuration of the network device to a configuration corresponding to the node 402-3, and updating the configuration of the network device to a configuration corresponding to the node 402-4.

The data tree 400 may be used to propagate configuration updates for network devices with different network device properties. For instance, for a plurality of devices having an initial configuration corresponding to the node 402-1, configuration updates corresponding to nodes 402-5 and 402-6 may be propagated to a set of the network devices. A first configuration update corresponding to a node 402-7 may be propagated to a first subset of the set of network devices. A second configuration update corresponding to a node 402-8 may be propagated to a second subset of the set of network devices. The first configuration update is applicable to network devices having a first set of properties whereas the second configuration update is applicable to network devices having a second set of properties different from the first set of properties.

Figure 5:
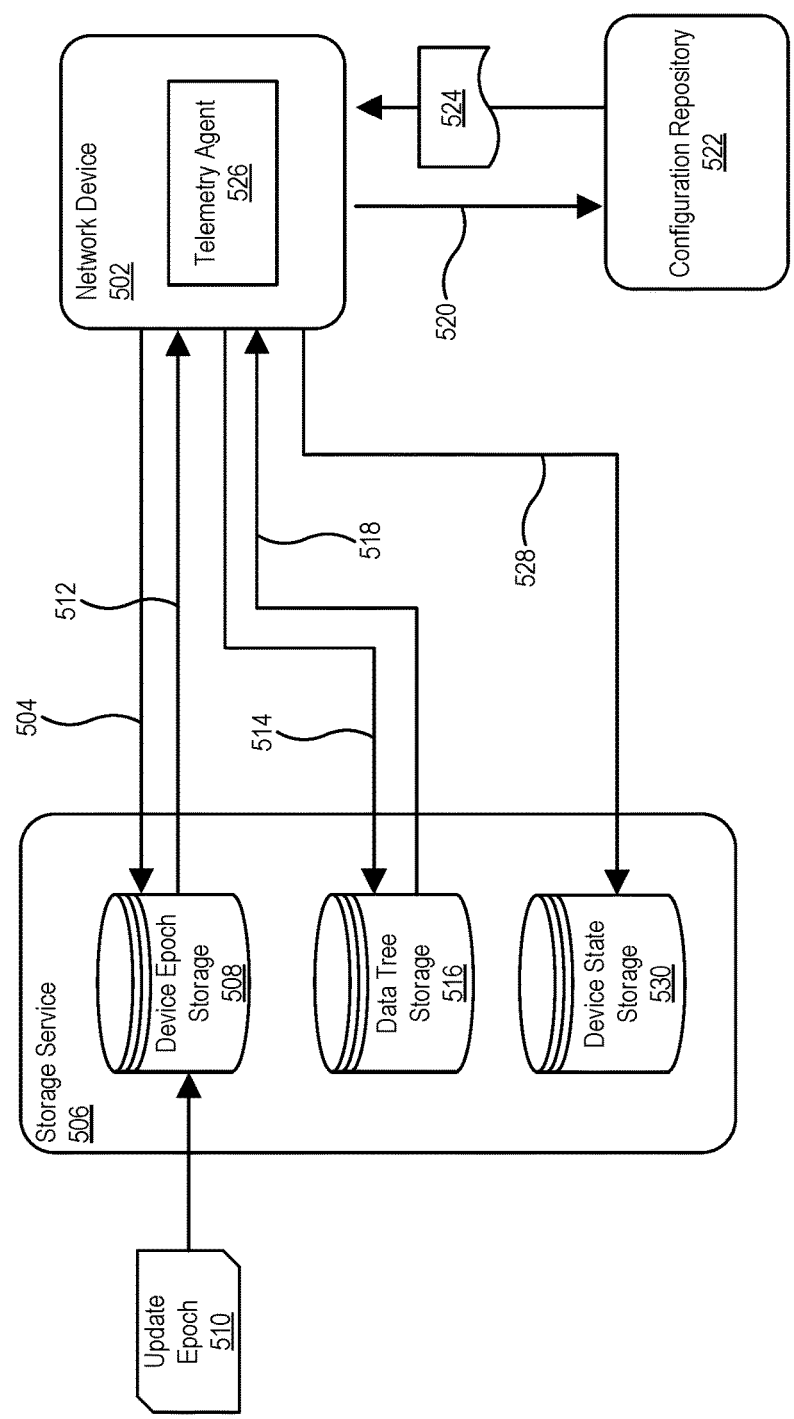
FIG. 5 illustrates an environment in which a configuration management service interacts with a network device to propagate configuration updates according to one or more embodiments.

FIG. 5 shows an environment 500 in which a configuration management service interacts with a network device to propagate configuration updates according to one or more embodiments. Various features in FIG. 5 are substantially similar to features described with respect to FIGS. 1, 2, 3, 4, and elsewhere herein, so further discussion thereof is omitted for brevity. In the environment 500, a network device 502 sends, over one or more networks, a subscription request 504 to a storage service 506 of a configuration management service described herein. The subscription request 504 includes network device properties of the network device 502, such as those described with respect to the subscription request 236 of FIG. 2 and elsewhere herein. The subscription request 504 is registered in device epoch storage 508.

Subsequent to registering the subscription request 504, an epoch update 510 is registered in the storage service 506. The storage service 506 may make a determination that the epoch update 510 is associated with a set of network device properties matching the properties of the network device 502. In response to the determination, the storage service 506 sends a notification 512 to the network device 502 indicating that a configuration update applicable to the network device 502 is available. The notification 512 may include an identifier of a node in a data tree, as discussed with respect to FIG. 4 and elsewhere herein.

The network device 502, in response to the notification 512, sends a path request 514 to a data tree storage 516 that stores one or more data trees comprising nodes and segments representing configuration updates, as discussed herein. The path request 514 includes a first node identifier of a node in the data tree and a second node identifier corresponding to a last configuration update implemented in the network device 502, such as a timestamp associated with a configuration update represented in a data model. In some embodiments, the path request 514 may include information specific to the network device 502, such as information indicating the model or make of the network device 502.

The data tree storage 516 accesses a data tree corresponding to the network device 502 and determines a set of nodes and/or segments of the data tree connecting the first node identifier and the second node identifier. The first node identifier corresponds to a configuration update associated with the notification 512 and the second node identifier corresponds to a last configuration update implemented in the network device 502. The data tree store 516 determines a set of nodes and/or segments of the data model connecting the first node and the second node. The data tree store 516 sends path information 518 that includes identifiers of the connecting nodes and/or connecting segments of the data model. In some implementations, the path information 518 may include information identifying the configuration updates associated with the connecting nodes and identifying an order in which the configuration updates are to be installed.

As an example described with respect to FIG. 4, the network device 502 may be in an original system state or a factory reset state corresponding to the node 402-1 discussed with respect to FIG. 4. The notification 512 may include an identifier of the node 402-8 and the network device 502 may therefore send the path request 514 with identifiers of the node 402-1 and the node 402-8. In some implementations, the network device 502 may omit an identifier of the node 402-1 if the network device 502 is in the original system state. The data tree store 516 determines that the nodes 402-6 and 402-5 connect the nodes 402-1 and 402-8. As a result, the storage service 506 may send path information 518 that includes identifiers of the node 402-5 and the node 402-6. The path information 518 may include information indicating that the configuration updates corresponding to the nodes 402-5 and 402-6 should be installed in order prior to installation of the configuration update corresponding to the node 402-8.

The network device 502 sends, over one or more networks, a request 520 to a configuration repository 522 for configuration updates corresponding to the identifiers in the path information 518. The configuration repository 522 obtains and sends, over the one or more networks, a set of configuration updates 524 requested. The network device 502 installs the set of configuration updates 524 in the order specified in the path information 518.

The network device 502, in some embodiments, includes a telemetry agent 526 running on an operating system of the network device 502. The telemetry agent 526 may send, over the one or more networks, device state information 528 to device state data storage 530 of the storage service 506. The device state information 528 may include information indicating the success or failure of installing the set of configuration updates 524, and/or information regarding operation of the network device 502. The information regarding operation of the network device 502 may include information regarding performance of the network device 502, such as network traffic throughput, Quality of Service, data rate, number of connected devices, and fault tolerance, by way of non-limiting example. The device state information 528 may be used to evaluate one or more configuration updates implemented on the network device 502.

Figure 6A:
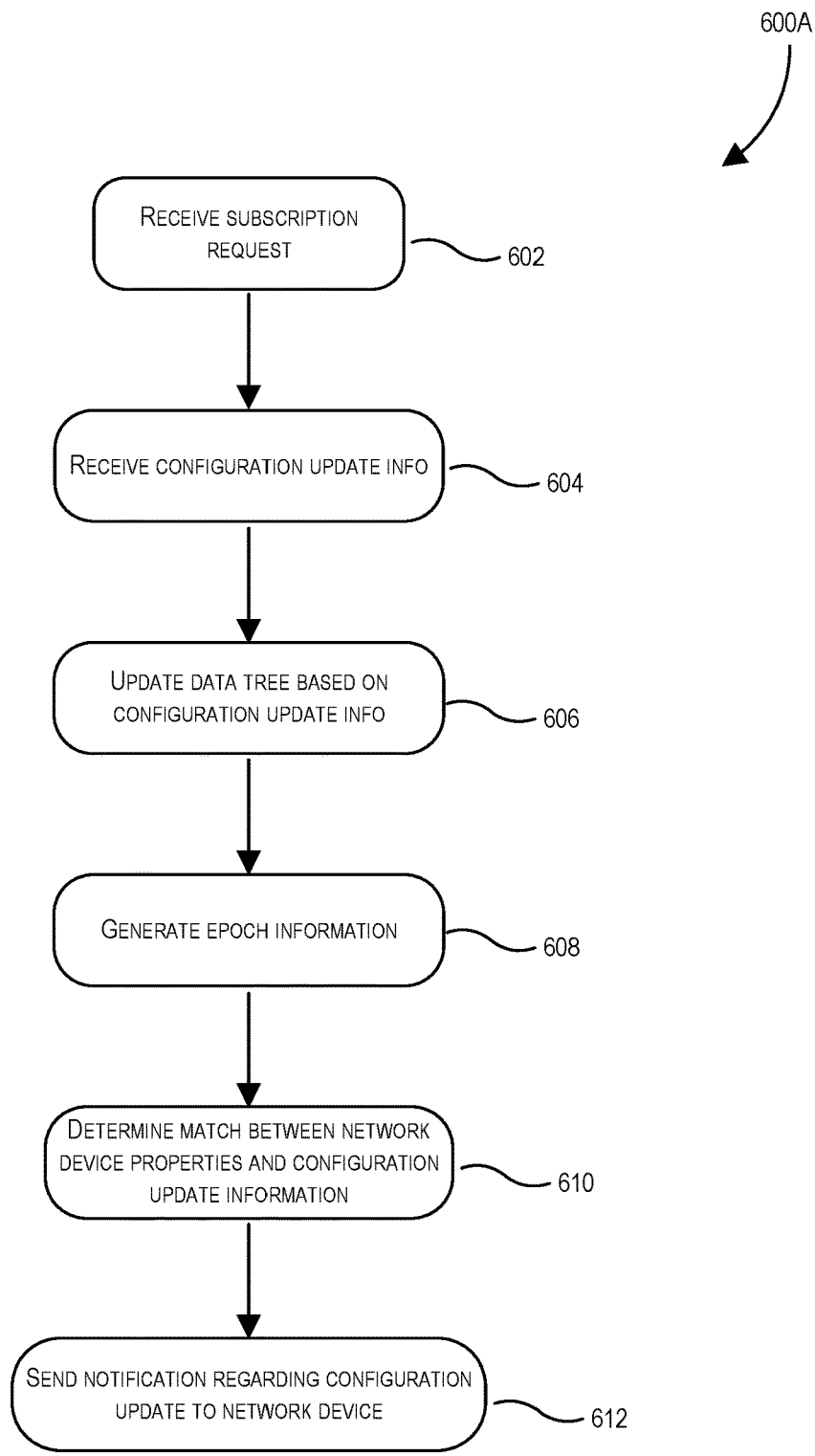
FIG. 6A illustrates a method for managing configuration updates in a plurality of network devices according to one or more embodiments.

FIG. 6A illustrates a method 600A for implementing configuration updates for network devices according to one or more embodiments. The method 600A may be performed by one or more appropriate entities described herein, such as a configuration management service for managing configuration updates of a plurality of network devices. The operations described with respect to the method 600A may be performed in a different sequence than the sequence of operations shown and described with respect to FIG. 6A without departing from the scope of the present disclosure.

The method 600 includes receiving, at 602, a subscription request from a network device to receive notifications regarding configuration updates that are applicable to the network device. The subscription request may include information indicating a set of properties of the network device. A plurality of subscription requests may be received from a plurality of network devices having different network device properties.

The method 600A also includes receiving, at 604, configuration update information regarding a configuration update in a configuration repository that stores a collection of configuration updates for network devices. The configuration update information may include a set of network device criteria for network devices to which the configuration update is to be applied. The set of network device criteria, for example, may identify a set of network device properties of the network devices to which the configuration update is to be applied. The configuration update information may include information identifying the entity implementing the configuration update and/or a data tree with which the configuration update is associated.

At 606, the method 600A includes updating a data tree based on the configuration update. The data tree has nodes representing configuration updates and having segments representing relationships between configuration updates, as described with respect to FIG. 4 and elsewhere herein. The method 600A further includes generating, at 608, epoch information associated for the update to the data tree. The epoch information may include an identifier unique to the data tree update, such as a timestamp, a hash value, or a random number. The epoch information, in some embodiments, includes path information referencing a path in the data tree. The path information, for instance, may identify a set of segments connecting data objects (e.g., nodes) of the data tree. The epoch information is stored in an epoch data store, as described with respect to FIGS. 2, 3, and elsewhere herein. The epoch information may be used to generate device-epoch information identifying a set of network devices, as described with respect to FIG. 3.

The method 600A includes determining, at 610, a match between the configuration update information and one or more sets of network device properties. More particularly, it is determined that the network device properties of one or more network devices satisfy the set of network device criteria included in the configuration update information received in 602. For instance, a set of network device properties of a first network device may be determined as being a match with network device properties in the set of network device criteria. Determining a match in 610 may include performing comparisons between the set of network device criteria and a collection of stored network device information indicating properties of a plurality of network devices and determining that the set of network device properties satisfy the set of network device criteria as a result of the comparisons.

As a result of determining the match in 610, the method 600A includes sending, at 612, over one or more networks, a notification regarding the configuration update corresponding to the configuration update information to the network device having the matching network device properties. The notification sent in 612 may include information regarding the epoch information generated in 608, such as a first identifier associated with the data tree update and/or information referencing a path in the data tree.

Figure 6B:
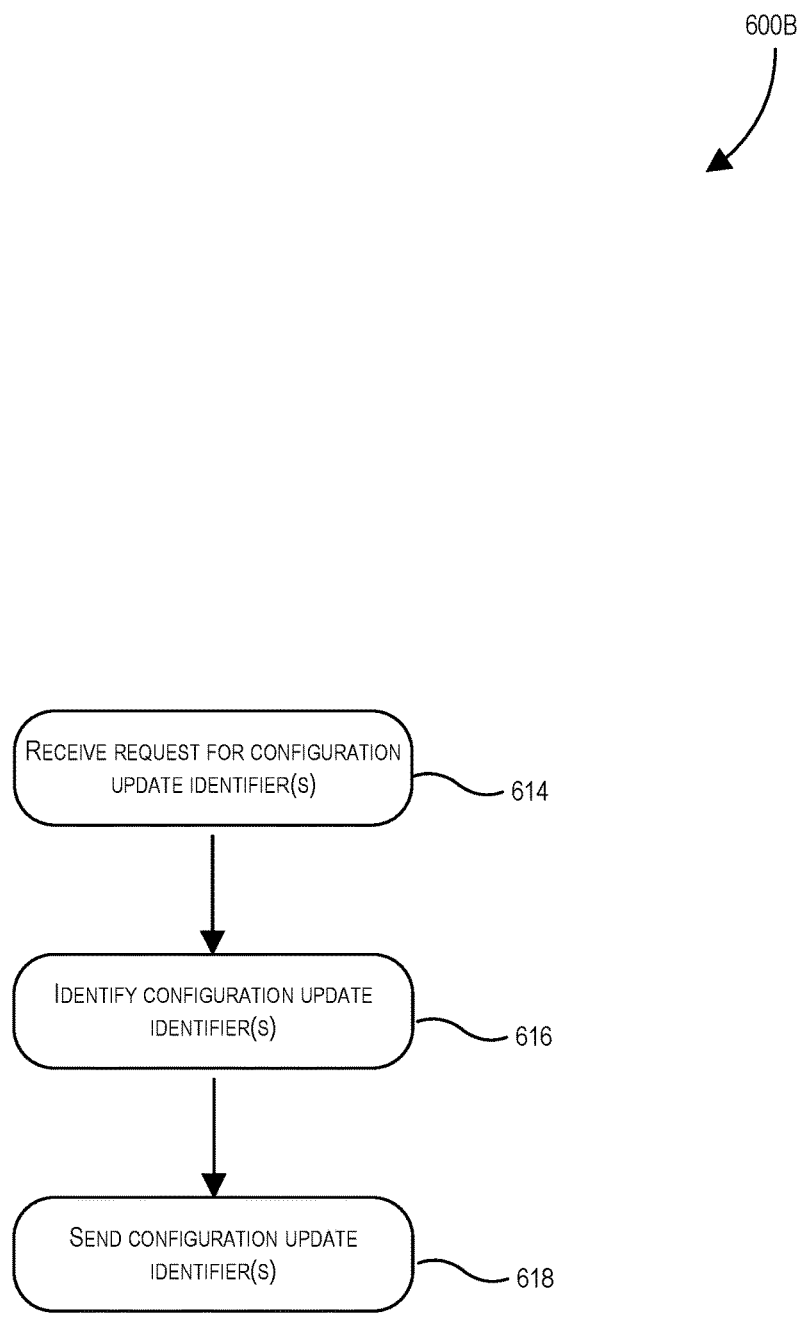
FIG. 6B illustrates a method for managing configuration updates in a plurality of network devices according to one or more embodiments.

FIG. 6B illustrates a method 600B for implementing configuration updates for network devices according to one or more embodiments. The method 600B may be performed by one or more appropriate entities described herein, such as a configuration management service for managing configuration updates of a plurality of network devices. The operations described with respect to the method 600B may be performed in a different sequence than the sequence of operations shown and described with respect to FIG. 6B without departing from the scope of the present disclosure. The method 600B may be performed in connection with operations described with respect to the method 600A. For example, the method 600B may be performed as a result of sending the notification in 612. Various operations described with respect to the method 600B are described with respect to FIG. 5.

The method 600B includes receiving, at 614, a request from a network device for an identifier of a configuration update. The request received in 614 may include the first identifier associated with the data tree update that was included in the notification sent in 612 of the method 600A. The request received in 614 may also include a second identifier that identifies a configuration update previously implemented by the network device. As a particular non-limiting example, the request in 614 may include a first timestamp associated with a configuration update represented in the data tree and a second timestamp indicating the last configuration update implemented by the network device. The request received in 614 may include the path information referencing a set of segments in the data tree, such as a segment associated with a data object representing the configuration update in the data tree.

At 616, the method 600B includes identifying a set of identifiers for configuration updates represented in the data tree. For instance, the configuration management service may identify a set of data objects between the first and second identifiers, and the segments connecting adjacent data objects of the set of data objects. The set of data objects correspond to a plurality of configuration updates that should be implemented by the network device prior to implementing the configuration update of the configuration update information received in 602. In some implementations, the network device may not have been previously updated or may be in a factory reset state. In such implementations, the configuration management service may identify data objects between the data object associated with the first identifier and an origin data object of the data tree (e.g., node 402-1 of FIG. 4). In some embodiments, the data object of the second identifier may be adjacent to the data object of the first identifier.

The method 600B further includes sending, at 618, the set of configuration update identifiers identified in 616 to the network device from which the request was received in 614. The set of configuration update identifiers identify configuration updates stored in the configuration repository. The set of configuration update identifiers sent in 618 may include an indication of an order in which the configuration updates are to be implemented. The network device may use the set of configuration update identifiers to obtain and implement or install the configuration updates identified.

The epoch model system and techniques described herein preserve transactional nature of configuration updates by separately recording identifiers for the data tree updates and an identifier for a transaction, such as a configuration update. Network devices may subscribe to epoch updates instead of subscribing to paths directly. In response to receiving an epoch update, a network device may submit a request for information regarding relevant paths associated with the epoch identifier and receive all updates a single time. This ability is useful for propagating requests to configuration repositories.

Figure 7:
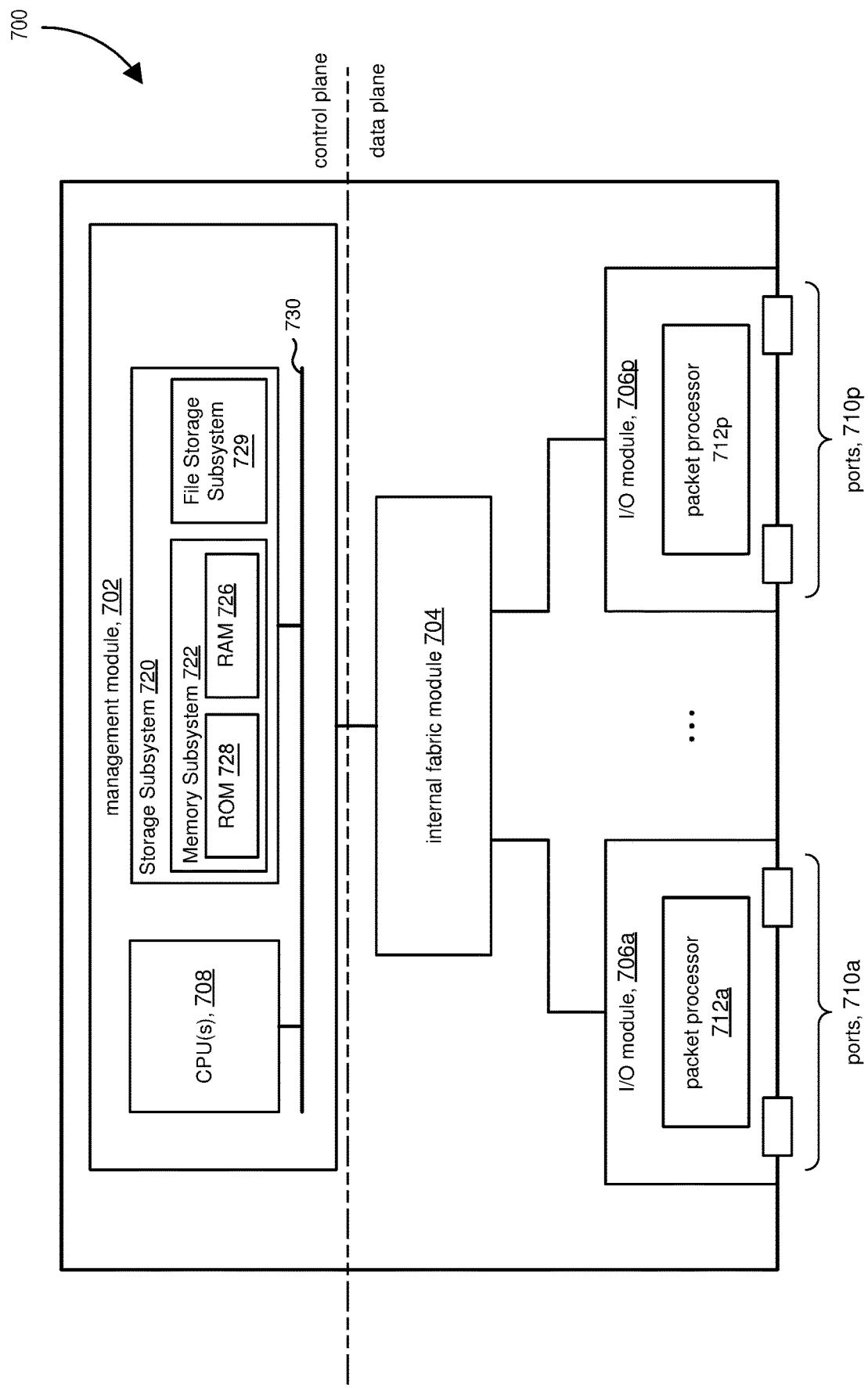
FIG. 7 illustrates a network device that can be adapted according to one or more embodiments.

FIG. 7 illustrates a network device 700 that can be adapted according to one or more embodiments of the present disclosure. The network device 700 may be a network switch, a router, a hub, a bridge, or an access point, by way of non-limiting example. The term "network device," as used herein, refers to an electronic device that mediates data transfer between two computing devices (e.g., servers, laptops, mobile devices).

As shown, network device 700 can include a management module 702, an internal fabric module 704, and a number of I/O modules 706a-706p. The management module 702 may be located in a control plane (also referred to as control layer) of the network device 700 and can include one or more management CPUs 708 for managing and controlling operation of network device 700 in accordance with the present disclosure. Each management CPU 708 can be a general-purpose processor, such as an Intel®/AMD® x86-64 or ARM® processor, that operates under the control of software stored in memory, such as a storage subsystem 720, which may include read-only memory 728 and/or random access memory 726 and file storage subsystem 729, and includes a bus 730. In some embodiments, the CPU 708 may include control circuitry, and may include or be coupled to a non-transitory storage medium storing encoded instructions that cause the CPU 708 to perform operations described herein. In some embodiments, the non-transitory storage medium may include encoded logic or hardwired logic for controlling operation of the CPU 708. The control plane refers to all the functions and processes that determine which path to use, such as routing protocols, spanning tree, and the like.

Internal fabric module 704 and I/O modules 706a-706p collectively represent the data plane of network device 700 (also referred to as data layer, forwarding plane, etc.). Internal fabric module 704 is configured to interconnect the various other modules of network device 700. Each I/O module 706a-706p includes one or more input/output ports 710a-710p that are used by network device 700 to send and receive network packets. Each I/O module 706a-706p can also include a packet processor 712a-712p. Each packet processor 712a-712p can comprise a forwarding hardware component configured to make wire speed decisions on how to handle incoming (ingress) and outgoing (egress) network packets. In some embodiments, the forwarding hardware can comprise an application specific integrated circuit (ASIC), a field programmable array (FPGA), a digital processing unit, or other such collection of configured logic.

Figure 8:
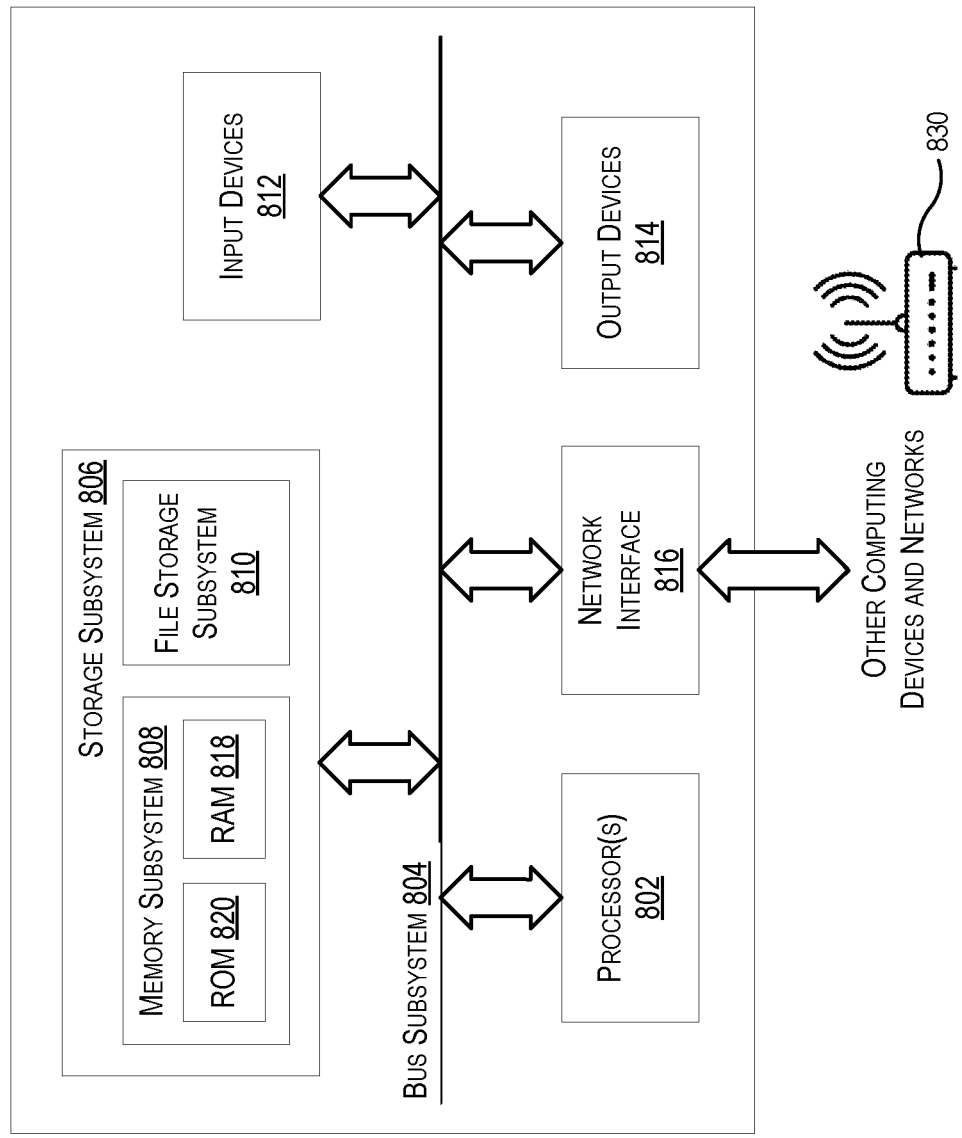
FIG. 8 illustrates a simplified block diagram of an example computer system according to one or more embodiments.

FIG. 8 illustrates a simplified block diagram of an example computer system 800 according to certain embodiments. The configuration management service described herein may comprise one or more computer systems 800. In some embodiments, the configuration management service may be part of a distributed computing system in which a plurality of computer systems 800 are in different locations. The computer system 800 can be used to implement any of the computing devices, systems, or servers described in the foregoing disclosure. As shown in FIG. 8, computer system 800 includes one or more processors 802 that communicate with a number of peripheral devices via a bus subsystem 804. These peripheral devices include a storage subsystem 806 (comprising a memory subsystem 808 and a file storage subsystem 180), user interface input devices 812, user interface output devices 814, and a network interface subsystem 816.

Bus subsystem 804 can provide a mechanism for letting the various components and subsystems of computer system 800 communicate with each other as intended. Although bus subsystem 804 is shown schematically as a single bus, alternative embodiments of the bus subsystem can utilize multiple busses.

Network interface subsystem 816 can serve as an interface for communicating data between computer system 800 and other computer systems or networks. Embodiments of network interface subsystem 816 can include, e.g., an Ethernet card, a Wi-Fi and/or cellular adapter, a modem (telephone, satellite, cable, ISDN, etc.), digital subscriber line (DSL) units, and/or the like. The computer system 800 may communicate with one or more network devices 830 described herein via the network interface subsystem 816.

User interface input devices 812 can include a keyboard, pointing devices (e.g., mouse, trackball, touchpad, etc.), a touchscreen incorporated into a display, audio input devices (e.g., voice recognition systems, microphones, etc.) and other types of input devices. In general, use of the term "input device" is intended to include all possible types of devices and mechanisms for inputting information into computer system 800.

User interface output devices 814 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 800.

Storage subsystem 806 includes a memory subsystem 808 and a file/disk storage subsystem 810. Subsystems 818 and 820 represent non-transitory computer-readable storage media that can store program code and/or data that provide the functionality of embodiments of the present disclosure.

Memory subsystem 808 includes a number of memories including a main random-access memory (RAM) 818 for storage of instructions and data during program execution and a read-only memory (ROM) 820 in which fixed instructions are stored. File storage subsystem 810 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 800 is illustrative and many other configurations having more or fewer components than system 800 are possible.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices may include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members.

Conjunctive language, such as phrases of the form "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as," "for instance," "by way of example") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Embodiments disclosed herein include one or more methods comprising receiving configuration update information regarding a configuration update in a configuration repository, the configuration update information indicating a set of network device criteria of network devices to which the configuration update is to be applied; implementing an update to a data tree based on the configuration update information; generating epoch information for the update; determining that network device properties of a network device satisfy the set of network device criteria; and sending, over one or more networks to the network device, a notification indicating the availability of the configuration update and including at least a portion of the epoch information.

In some embodiments, the configuration update information includes a configuration update identifier. In some embodiments, the method comprises receiving, over the one or more networks from the network device, a request for the configuration update identifier, the request including a first epoch identifier of the epoch information; determining the configuration update identifier based on the first epoch identifier; and sending, over the one or more networks, the configuration update identifier to the network device.

In some embodiments, the request includes a second epoch identifier. In some embodiments, the method comprises determining a collection of data objects of the data tree based on the first epoch identifier and the second epoch identifier. In some embodiments, the configuration update identifier is included in the collection of data objects.

In some embodiments, the epoch information includes a first epoch identifier and path information referencing a path in the data tree. In some embodiments, the data tree has nodes representing configuration updates and having segments representing relationships between configuration updates.

In some embodiments, the method comprises receiving, over the one or more networks from the network device, a request for notifications regarding configuration updates that are applicable to the network device, the request including device information indicating a set of properties of the network device.

In some embodiments, the method comprises performing comparisons between the set of network device criteria and a collection of stored network device information indicating properties of a plurality of network devices; and determining that the set of network device properties satisfy the set of network device criteria as a result of the comparisons.

Embodiments of the present disclosure include one or systems comprising one or more processors; and one or more non-transitory storage media storing instructions executable by the one or more processors. Execution of the instructions causes the system to receive first configuration update information regarding a first configuration update in a configuration repository, the first configuration update information indicating a first set of network device properties of network devices to which the first configuration update is to be applied; implement a first update to a first data tree based on the first configuration update information; generate a first identifier for first update; determine that network device properties of a first network device satisfy the first set of network device properties; and send, over one or more networks to the first network device, a first notification indicating the availability of the first configuration update and including the first identifier.

In some embodiments, execution of the instructions causes the system to receive second configuration update information regarding a second configuration update in the configuration repository, the second configuration update information indicating a second set of network device properties of network devices to which the second configuration update is to be applied; implement a second update to a second data tree based on the second configuration update information; generate a second identifier for the second update; determine that network device properties of a second network device satisfy the second set of network device properties; and send, over one or more networks to the second network device, a second notification indicating the availability of the second configuration update and including the second identifier.

In some embodiments, execution of the instructions causes the system to receive, over the one or more networks from the first network device, a request for a configuration update identifier, the request including the first identifier and a second identifier associated with the data tree; determine a set of configuration update identifiers based on the first identifier and the second identifier; and send, over the one or more networks, the set of configuration update identifiers to the first network device.

In some embodiments, the first notification includes path information referencing one or more objects in the data tree.

In some embodiments, execution of the instructions causes the system to determine that network device properties of a plurality of network devices satisfy the first set of network device properties; and update a record identifying the plurality of network devices to which the first configuration update applies.

In some embodiments, the first update indicates a relationship of the first configuration update to a previous configuration update for a set of network devices.

In some embodiments, execution of the instructions causes the system to receive, over the one or more networks from the first network device, a request for notifications regarding configuration updates that are applicable to the first network device, the request including device information indicating a set of properties of the first network device.

Embodiments of the present disclosure include one or more non-transitory computer readable media storing instructions that are executable by one or more processors. Execution of the instructions stored on the one or more non-transitory computer readable media causes the one or more processors to receive configuration update information regarding a configuration update in a configuration repository, the configuration update information indicating a set of network device properties of network devices to which the configuration update is to be applied; implement an update to a data tree based on the configuration update information; generate a first identifier unique to the update to the data tree; determine that network device properties of a network device correspond to the set of network device properties; and send, over one or more networks to the network device, a notification indicating the availability of the configuration update and including the first identifier.

In some embodiments, the update to the data tree includes adding, to the data tree, a first data object and an association between the first data object and a second data object of the data tree.

In some embodiments, execution of the instructions stored on the one or more non-transitory computer readable media causes the processors to receive, over the one or more networks from the first network device, a request for a set of configuration update identifiers, the request including the first identifier and a second identifier associated with the data tree.

In some embodiments, the first notification includes path information referencing one or more objects in the data tree.

In some embodiments, execution of the instructions stored on the one or more non-transitory computer readable media causes the processors to receive, over the one or more networks from the network device, a request for notifications regarding configuration updates that are applicable to the network device, the request including device information representative of a set of properties of the network device.

In some embodiments, execution of the instructions stored on the one or more non-transitory computer readable media causes the processors to perform comparisons between the set of network device properties indicated and network device properties records of a plurality of network devices; and determine that network device properties of the first network device correspond to the set of network device properties as a result of the comparisons.

Embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

The invention claimed is:

1. A method in a computer system for configuring network devices in a network, the method comprising:
   receiving configuration update information regarding a configuration update, the configuration update information including a set of network device criteria of network devices to which the configuration update is to be applied;
   updating a data tree based on the configuration update information, wherein the data tree comprises first data representing configuration states of network devices and second data representing changes between the configuration states;
   generating epoch information for the configuration update, the epoch information comprising an epoch identifier and path information referencing a path in the data tree to a data tree node representing the configuration update; and
   sending a notification to a matching network device whose network device properties match the set of network device criteria, the notification indicating availability of the configuration update and including the epoch information that identifies the configuration update, wherein the matching network device uses the epoch information to access the configuration update.

2. The method of claim 1, wherein the configuration update information includes a configuration update identifier, the method further comprising:
   receiving, from the network device, a request for the configuration update identifier, the request including a first epoch identifier that identifies first epoch information;
   determining the configuration update identifier based on the first epoch identifier; and
   sending the configuration update identifier to the network device.

3. The method of claim 2, wherein the request includes a second epoch identifier that identifies second epoch information, the method comprising:
   determining a collection of data objects of the data tree based on the first epoch identifier and the second epoch identifier, wherein the configuration update identifier is included in the collection of data objects.

4. The method of claim 1, wherein the data tree has nodes representing configuration updates and having segments representing relationships between configuration updates.

5. The method of claim 1, comprising:
   receiving, from the network device, a request for notifications regarding configuration updates that are applicable to the network device, the request including device information indicating a set of properties of the network device.

6. The method of claim 5, comprising:
performing comparisons between the set of network device criteria and a collection of stored network device information indicating properties of a plurality of network devices; and
determining that the set of network device properties satisfy the set of network device criteria as a result of the comparisons.

7. A system, comprising:
one or more processors; and
one or more non-transitory storage media storing instructions that, as a result of execution, cause the system to:
receive first configuration update information regarding a first configuration update in a configuration repository, the first configuration update information indicating a first set of network device properties of network devices to which the first configuration update is to be applied;
implement a first update to a first data tree based on the first configuration update information, wherein the first data tree comprises first data representing configuration states of network devices and second data representing changes between the configuration states;
generate a first identifier for the first update; and
send a first notification to a first network device whose network device properties match the first set of network device properties, the first notification indicating availability of the first configuration update and including the first identifier,
wherein the first notification includes path information referencing one or more objects in the data tree that represent the first configuration update.

8. The system of claim 7, execution of the instructions causing the system to:
receive second configuration update information regarding a second configuration update in the configuration repository, the second configuration update information indicating a second set of network device properties of network devices to which the second configuration update is to be applied;
implement a second update to a second data tree based on the second configuration update information;
generate a second identifier for the second update; and
send a second notification to a second network device whose network device properties match the second set of network device properties, the first notification indicating availability of the second configuration update and including the second identifier.

9. The system of claim 7, execution of the instructions causing the system to:
receive, from the first network device, a request for a configuration update identifier, the request including the first identifier and a second identifier associated with the data tree;
determine a set of configuration update identifiers based on the first identifier and the second identifier; and
send the set of configuration update identifiers to the first network device.

10. The system of claim 7, execution of the instructions causing the system to:
determine that network device properties of a plurality of network devices satisfy the first set of network device properties; and
update a record identifying the plurality of network devices to which the first configuration update applies.

11. The system of claim 7, execution of the instructions causing the system to:
receive, from the first network device, a request for notifications regarding configuration updates that are applicable to the first network device, the request including device information indicating a set of properties of the first network device.

12. One or more non-transitory computer readable media storing instructions that, as a result of execution by one or more processors, cause the one or more processors to:
receive configuration update information regarding a configuration update in a configuration repository, the configuration update information indicating a set of network device properties of network devices to which the configuration update is to be applied;
implement an update to a data tree based on the configuration update information, wherein the data tree comprises first data representing configuration states of network devices and second data representing changes between the configuration states;
generate a first identifier unique to the update to the data tree;
send a notification to a network device whose network device properties match the set of network device criteria, the notification indicating availability of the configuration update and including the first identifier, wherein the notification includes path information referencing one or more objects in the data tree that represent the configuration update.

13. The one or more non-transitory computer readable media of claim 12, execution of the instructions causing the one or more processors to:
receive, from the network device, a request for a set of configuration update identifiers, the request including the first identifier and a second identifier associated with the data tree.

14. The one or more non-transitory computer readable media of claim 12, execution of the instructions causing the one or more processors to:
receive, from the network device, a request for notifications regarding configuration updates that are applicable to the network device, the request including device information representative of a set of properties of the network device.

15. The one or more non-transitory computer readable media of claim 12, execution of the instructions causing the one or more processors to:
perform comparisons between the set of network device properties indicated and network device properties records of a plurality of network devices; and
determine that network device properties of the network device correspond to the set of network device properties as a result of the comparisons.

16. The method of claim 1, wherein the network criteria include one or more of a make, model, build, and range of serial numbers of the network device.

17. The method of claim 1, wherein the network criteria include one or more of an operating system version, a firmware version, services, and applications to which the configuration update applies.

* * * * *